Nov. 5, 1935.  C. SAUZEDDE  2,019,508

AIRCRAFT BRAKING WHEEL STRUCTURE

Filed Aug. 20, 1931  2 Sheets-Sheet 1

INVENTOR
Claude Sauzedde
BY
ATTORNEYS

Nov. 5, 1935.    C. SAUZEDDE    2,019,508
AIRCRAFT BRAKING WHEEL STRUCTURE
Filed Aug. 20, 1931    2 Sheets-Sheet 2

INVENTOR
Claude Sauzedde
BY
ATTORNEYS

Patented Nov. 5, 1935

2,019,508

UNITED STATES PATENT OFFICE 2,019,508

AIRCRAFT BRAKING WHEEL STRUCTURE

Claude Sauzedde, Detroit, Mich., assignor to Detroit Hydrostatic Brake Corporation, Detroit, Mich., a corporation of Michigan Application August 20, 1931, Serial No. 558,299

11 Claims. (Cl. 188—152)

The present invention relates to rubber-tired aircraft wheels having hub-enclosed braking mechanism protected from physical injury as well as from excessive wear due to the presence of dirt and grit between contacting surfaces and against reduction of braking efficiency due to the presence of braking fluid, lubricant, or water, all of which "foreign" substances are completely excluded from the sealed hub chamber within which the braking mechanism is housed.

As indicated by the accompanying drawings, whereon like reference figures apply to the same parts, the wheel hub contains hydraulically-actuated mechanism for applying two-faced wedge-shaped brake shoes to angularly-disposed non-removable-cast-in-wear-resisting conical ring inserts around the interior of hub side members and opposite the exterior projecting side member fins or ribs. With iron or steel side members, however, the conically-shaped wear-resisting brake-shoe contacting rings may be permanently attached by welding. Similarly inserted bushings are cast in hub side members for housing anti-friction bearings mounted on a supporting stub shaft adapted for attachment to dead axles, to non-rotating housings having suitable "adapters", or to other fixedly-positioned parts serving the same purpose.

The principal object of the invention is to provide a self-contained unitary braking-wheel structure of great stress-resisting capacity and characterized by simplicity of construction, application, manipulation, and adjustment, and having a completely-closed sealed hub wherein fluid-pressure-actuated mechanism of extraordinary braking power is fully protected against the harmful action of dust, grit, water and lubricant on the contacting surfaces of brake shoes and of hub side members, against which the shoes are brought into wedging engagement when hydrostatic pressure is applied to the heads of actuating pistons urging brake shoes radially outward.

Figure 1:
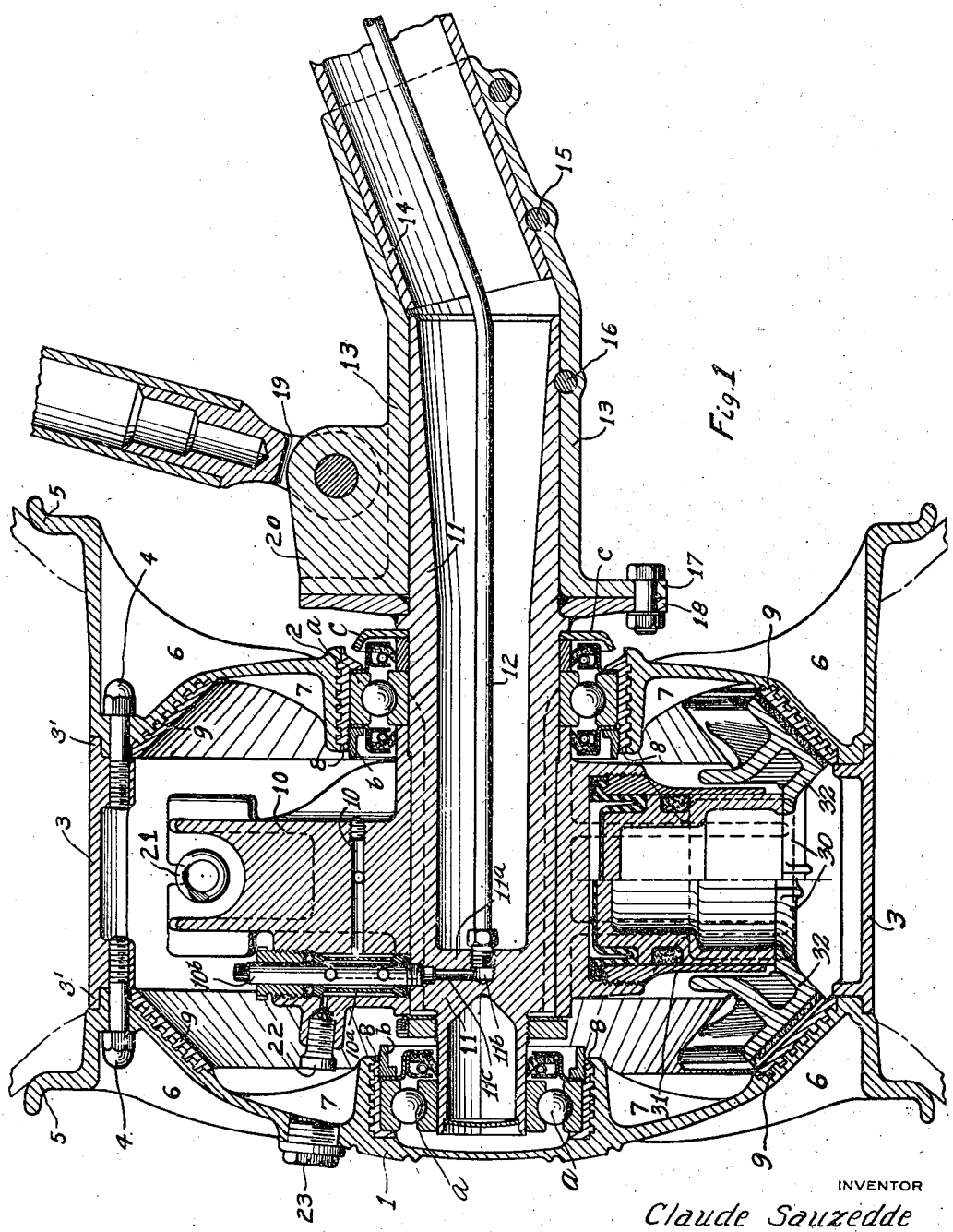
Figure 2:
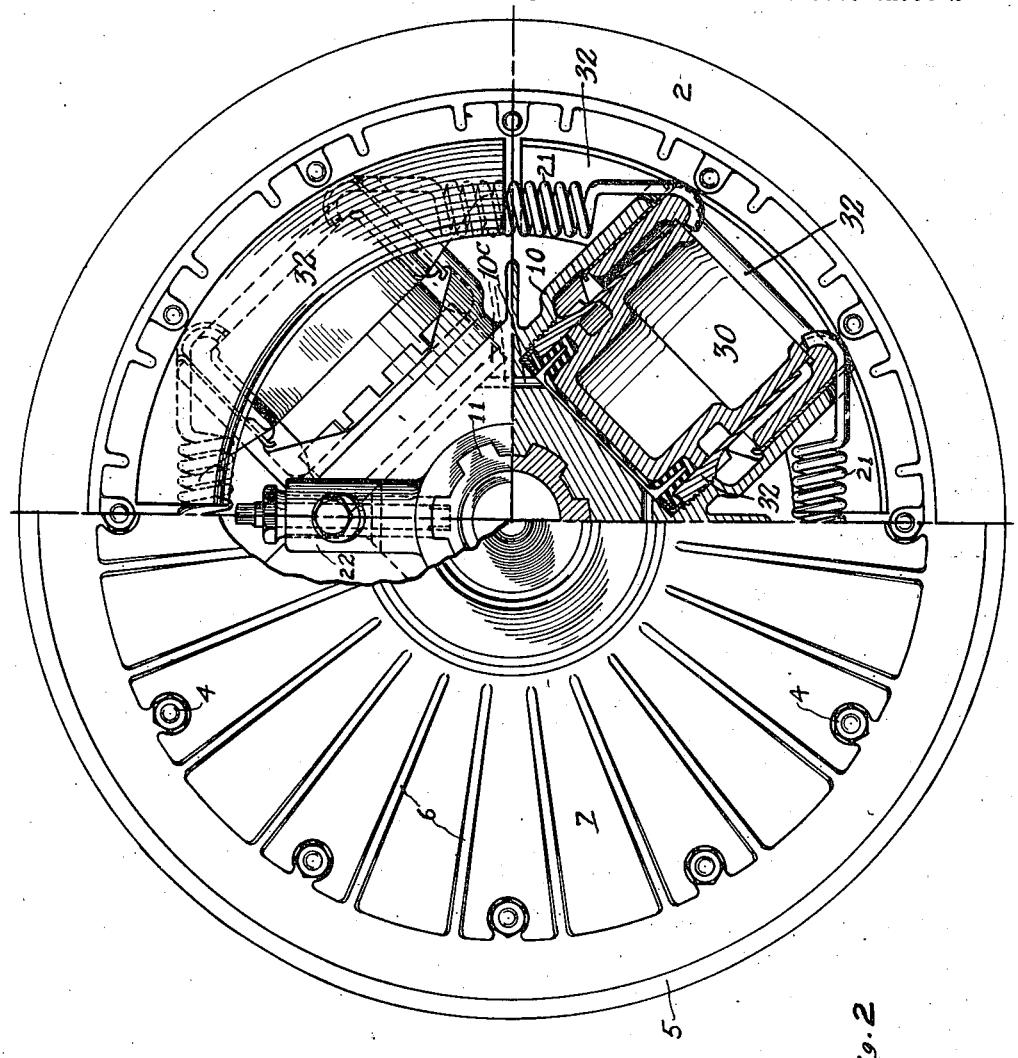

On the accompanying drawings,

Figure 1 is a transverse cross sectional view of the wheel, including the supporting stub shaft on which the wheel turns, the strut fitting to which the stub shaft is attached, the hollow dead axle, to each end of which a strut fitting is applied, and one of the struts connected to and supporting the dead axle and attached wheels;

Fig. 2 is a combined elevation and sectional view showing, at right, the radial disposition of hydraulic braking cylinders and brake-shoe actuating pistons therein, the tension springs by which sectional-type brake shoes are retracted and, at left, the radially disposed external ribbing of the outer side member surface of the hub, which is broken away to permit of showing in elevation the bleeding valve for removing air from the braking system.

The elemental components constituting the wheel structure proper comprise a pair of circular oppositely-disposed outer and inner side members 1 and 2 united by a spacing ring 3 that serves as a piloting, aligning, and chamber-closing member of the hub, the demountable outer side member of which is recessed and bushed for an anti-friction bearing $a$ of suitable type, the inner side member being similarly bushed for a similar bearing and axially pierced to receive the wheel-supporting stub shaft on which the bearings are mounted, both side members being recessed to receive the peripheral piloting projections 3' of the spacing ring 3, to which they are demountably held by cap bolts 4. The integral outwardly-directed flanges 5 of the hub side members 1 and 2 obviate the necessity for a separate tire rim, also eliminating retaining rings and lugs.

The present invention is of the general type of that disclosed in the companion application filed March 31, 1930, Serial No. 440,276, the differences being more particularly in features which permit the general system to be employed in the particular service herein pointed out, a service of a different nature from that of the usual motor vehicle service.

For heat-dissipating as well as supporting purposes, each of the hub side members is externally provided with a plurality of integral radially-disposed ribs 6, similarly-disposed internal ribs 7 serving to strengthen the hub side members and thereby increase their stress-resisting capacity. The external ribbing 6 of inner hub side member 2 is such as to provide for "offset" positioning of a large pneumatic tire held in place by the hub side member flanges 5.

The bearing bushing inserts 8 and brake-shoe contacting-plate inserts 9 provide adequate stress-resisting support and wear-resisting qualities to insure longevity and a high order of structural integrity under trying service conditions.

Both outer and inner anti-friction hub side-member bearings $a$ are effectively sealed by rotating metal-enclosed packings $b$ that prevent flow of lubricant therefrom into the hub chamber, the outer end of the inner bearing being similarly sealed to prevent entrance of dust particles and water, a stationary shield $c$ serving to exclude the larger particles of dirt and grit.

The outer bearing is so mounted in the hub outer side member 1 that it is withdrawn from the stub shaft 11 whenever the side member is removed for replacing a tire, the inner bearing race having a sliding fit on the outer end of the stub shaft 11.

The wheel-supporting element consists of an externally-splined and threaded stub-shaft 11, drilled out from its opposite ends to reduce weight with a web separation, the web, indicated at 11a, being provided with an axially-drilled passage 11b threaded to receive the threaded end of a pipe 12, the latter forming a conduit for the delivery of fluid under pressure from a suitable source. The passage 11b is continued in the form of a transverse passage 11c which opens into a supply chamber 10a, preferably through a duct 10b extending into this chamber; the specific structure of the latter arrangement is disclosed more particularly in my companion application, Serial No. 567,671, filed October 8, 1931. The supply chamber 10a opens, through a series of connected channels 10c formed in a spider 10 splined to the shaft 11, to the individual piston chambers of a plurality of radially-movable pistons 30 mounted in cylinders 31 individual to the pistons and which form parts of a hydrostatic braking system which forms the subject matter of companion applications which pertain more particularly to the brake mechanism per se. Brake shoes of such mechanism, indicated as 32, are operatively connected to the pistons 30 to move therewith, these shoes having faces inclined to the piston axes which are adapted to coact with complemental brake-shoe contacting plate inserts 9, the brake shoes being preferably of the double-faced sectional type form disclosed in such applications, not being claimed specifically herein, being more particularly claimed in the companion applications. As illustrated, the pistons and cylinders are preferably arranged symmetrical to the side members 1 and 2, thus placing the piston axes as lying within the zone width of the annular member 3.

To illustrate the length of movement of the pistons between the active and inactive positions of the brake shoes, the piston 30, in Fig. 1 is considered as divided along its axis, with one side presented in the shoe-inactive position and the other side as in the shoe-active position, the showing thus indicating somewhat of the relatively small amount of fluid needed to provide the shift, and indicating the sufficiency of the small pipe 12 as the conduit for supplying the fluid.

The stub shaft 11 is rigidly supported by the flanged and split strut connection and adapter fitting 13 attached to the end of a non-rotating or dead-axle housing 14 held in place by a retaining bolt 15 passing through the fitting, a similar bolt 16 serving to hold the stub shaft in the fitting, of which flange 17 is bolted to the stub-shaft flange 18, the bifurcated end of the supporting strut 19 being bolted to an upstanding web or rib 20 of fitting 13, which may be of any shape or form suited to adapter requirements for any particular type of aircraft.

The braking mechanism carried by the supporting spider fixedly mounted on the stub shaft is symmetrically disposed with reference to the faces of the brake-shoe contacting plate inserts of the hub side members 1 and 2, radially-directed fluid-pressure actuation of sectional brake-shoe members having oppositely positioned angularly disposed "lined" contacting faces bringing the latter into wedging contact with the angularly-disposed machined faces of the hub side member contacting-plate inserts. The sectional two-faced brake shoes used are normally held in retracted or released position by "heavy" tension springs 21 whose axes lie in a plane embracing the cylinder center-lines, the pull of the retracting springs constantly maintaining pressure on the braking fluid, pressure fluctuation due to the presence of air being avoided through use of bleeding-valve 22 incorporated in the spider casting. In the general system referred to the initial filling of the system involves the discharge of the air therefrom, and to provide this action, the system includes a drainage opening in the bleeder valve 22. In the present invention, the same general characteristic is present, but since the outer side member forms a portion of the tire supporting structure, it is essential that this side member be in position at such time. Hence, provision is made for manipulating the drainage closure plug through the wall of the side member 1, the latter having an opening normally closed by plug 23 for this purpose, said opening permitting the passage of a suitable hollow wrench which, when positioned, permits the opening of the drainage pipe with the wrench forming a conduit to the outside of the member to permit the air and wasted fluid to escape into the hub chamber. When the filling operation is completed, the wrench closes the drainage line, and is then withdrawn since the position of the parts places the opening as spaced from the axis of wheel rotation, so that the wrench could not remain as a permanent part of the structure; in this respect, the arrangement has the characteristics of the usual tire-inflating equipment.

What I claim is:

1. A combined wheel and brake assembly for aircraft service, comprising an axle, a tire-receiving hub mounted thereon and having a tire seat, and fluid pressure brake mechanism within the hub and operatively connected to a source of fluid pressure supply through the axle, said hub including oppositely-disposed inner and outer side members rotatably supported on the axle and each carrying a flange of the tire seat, an annular member, said side members being spaced apart by and detachably secured to said annular member completing the tire seat, said inner and outer members carrying conical braking surfaces, the outer side member being removable bodily to permit mounting and demounting of the tire, said side and annular members providing a housing for the braking mechanism, said brake mechanism being carried by the axle and including brake shoe elements movable into and out of co-operating relation with the conical braking surfaces by radial movement of the elements.

2. An assembly as in claim 1 characterized in that the braking surfaces are positioned adjacent the junction location of the connected side and annular members.

3. An assembly as in claim 1 characterized in that the braking surfaces have their greatest radii adjacent the junction location of the connected side and annular members, the braking surfaces of the opposite side members extending laterally with opposite and equal inclinations in the direction of least radii of the surfaces to increase the distance between similar points of the opposite surfaces.

4. An assembly as in claim 1 characterized in that the side members are ribbed radially both internally and externally of the members.

5. An assembly as in claim 1 characterized in that the side members are ribbed radially externally with the ribs active in the support of the tire flange section carried by the respective members.

6. An assembly as in claim 1 characterized in that the inner face of each of the side members is radially ribbed with the brake surface zone lying between the ribbed zone and the tire-seat zone of the member.

7. An assembly as in claim 1 characterized in that the inner face of each of the side members is radially ribbed with the brake surface zone lying between the ribbed zone and the tire-seat zone of the member, the outer face of each side member being radially ribbed with the latter ribs active to support the tire-seat flange section of the member and overlying the brake surface zone of the opposite face of the member.

8. An assembly as in claim 1 characterized in that the brake mechanism includes an air-bleed formation positioned internally of the outer side member, said latter member having a removable closure to permit insertion of a tool for manipulating the formation while the side member is in operative position.

9. An assembly as in claim 1 characterized by radially-moving carriers subject to fluid pressure activity for supporting the brake-shoe elements, and springs for linking the brake-shoe elements into a linked series, whereby brake shoe activity is provided by fluid pressure and inactivity of the shoes provided by spring activity in presence of fluid pressure release.

10. An assembly as in claim 1 characterized by anti-friction bearings for supporting the hub, said bearings being guarded against entrance of extraneous detrius, whereby the braking surfaces and brake mechanism will be unaffected by dust, etc.

11. An assembly as in claim 1 characterized in that the braking surfaces of a member are removable with the contacting faces of member and brake surface relatively formed to prevent shifting of the surface relative to the member in the direction corresponding to the direction of length of a cross-section of the conical face.

CLAUDE SAUZEDDE.